July 20, 1926.  
V. MATTIVI  
MINE CAR  
Filed Oct. 13, 1925  
1,593,091

Inventor  
Vigilo Mattivi.  
By Larry Lacey, Attorney

Patented July 20, 1926.

1,593,091

UNITED STATES PATENT OFFICE.

VIGILO MATTIVI, OF RAPSON, COLORADO.

MINE CAR.

Application filed October 13, 1925. Serial No. 62,315.

This invention relates to cars employed in mines for hauling coal or ore from the point where the mining operation is conducted to the mouth of the mine or to a point where the load may be transferred to other cars. The invention has for its object the provision of a very simple and inexpensive car which will effectually support the load placed therein and at the same time may be easily manipulated to discharge the load. The invention is illustrated in the accompanying drawing and will be hereinafter fully set forth.

Figure 1:
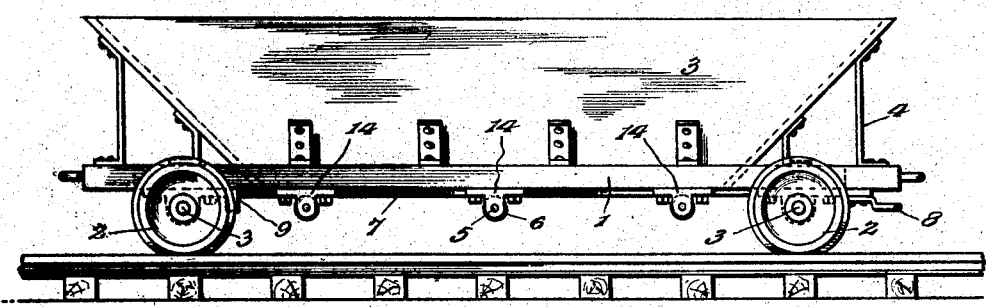
Figure 1 is a side elevation of a car embodying my present improvements.
Figure 2:
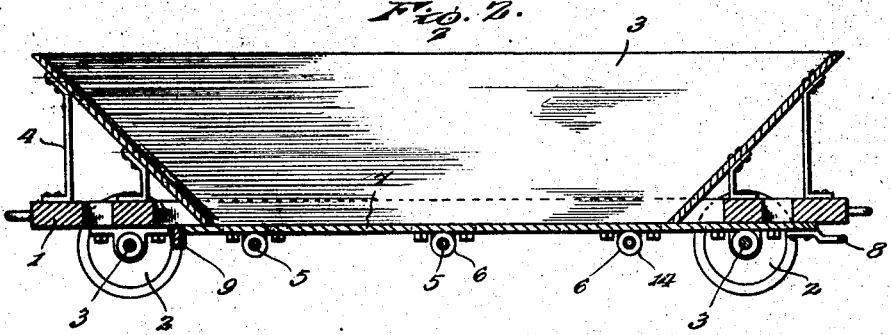
Fig. 2 is a longitudinal vertical section of the same.
Figure 3:
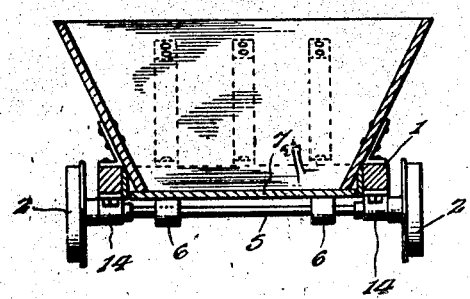
Fig. 3 is a transverse vertical section.
Figure 4:
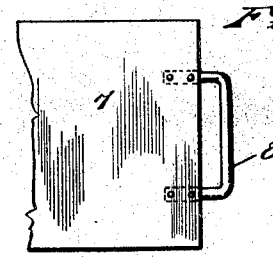
Fig. 4 is a detail plan view of one end of the slide which retains the load within the car.

The car in which my invention is embodied comprises a frame or truck 1 which is mounted upon wheels 2 adapted to run upon a track of the usual construction, and a hopper-like body 3 which is supported on the truck and rigidly connected therewith by suitable posts or braces 4, as shown and as will be understood. The hopper 3 has its sides and ends disposed on downwardly converging lines so that the load deposited in the hopper or body will gravitate to the bottom thereof. The car wheels 2 are carried by axles 3 which are supported in suitable bearings or brackets secured to the under sides of the side sills of the truck 1, and similar brackets or bearings 14 are secured to the said sills at intervals in the length of the same. Extending between the corresponding brackets, which are arranged in pairs, are rods or shafts 5 and upon each of these shafts or rods are mounted a plurality of rollers 6. The rollers 6 are of such diameter and the rods or shafts 5 are located at such a distance below the sides of the truck that the rollers will bear directly against and support a slide 7 which fits closely to the lower edges of the sides and ends of the hopper 3, as shown clearly in Figs. 2 and 3. At one end the slide is equipped with a handle 8 which is preferably so shaped that its grip portion will be spaced below the end sill of the truck, as shown clearly in Figs. 1 and 2, thereby facilitating the withdrawal of the slide in an obvious manner. At one end of the truck is provided a stop bar 9 which extends across the bottom of the truck and is rigidly secured to the under sides of the truck sills in any convenient or preferred manner.

It will be readily seen that the slide 7 constitutes the effective bottom of the hopper or car body and is inserted in its operative position by being pushed between the truck and the rollers 6 so as to rest upon the rollers, the insertion of the slide being limited by the impact of its inner end against the stop bar 9. The car is loaded and drawn to the point of discharge in the usual manner and, when the dump or discharge point is reached, the handle 8 is grasped and a pull exerted thereon to withdraw the slide from under the hopper, this movement of the slide being easily effected inasmuch as the rollers 6 will rotate as the slide is withdrawn and thereby facilitate its movement. Of course, as the slide is withdrawn the load will at once drop through the open bottom of the hopper and it may be received in another car upon a lower track or it may be discharged directly onto a dump. My car is exceedingly simple in construction and may be produced at a low cost while the construction is such that the parts will be very rigid and, therefore, will be strong and durable. The several parts of the car may be constructed of metal or wood or any other material which will possess the requisite strength and lasting qualities.

Having thus described the invention, I claim:

A mine car comprising a truck, a hopper secured rigidly upon the truck and having its bottom open throughout its area and its interior unobstructed, a plurality of rollers mounted on the truck below and in spaced relation to the bottom of the hopper, a slide freely insertable between the said rollers and the bottom of the hopper to rest upon the rollers and close the entire bottom of the hopper, the slide having a handle at one end, and a stop bar on the truck to receive the impact of the opposite end of the slide and limit the insertion of the slide, withdrawal of the slide permitting discharge through the entire area of the bottom of the hopper.

In testimony whereof I affix my signature.

VIGILO MATTIVI. [L. s.]